(12) United States Patent  (10) Patent No.: US 7,289,660 B2
Miura et al.  (45) Date of Patent: Oct. 30, 2007

(54) IMAGE DATA FILE MANAGEMENT SYSTEM AND METHOD

(75) Inventors: Yasutada Miura, Hachioji (JP); Toshihiko Tanaka, Komagane (JP)

(73) Assignee: Olympus Optical Co., Ltd., Tokyo (JP)

( * ) Notice: Subject to any disclaimer, the term of this patent is extended or adjusted under 35 U.S.C. 154(b) by 1075 days.

(21) Appl. No.: 10/215,099

(22) Filed: Aug. 8, 2002

(65) Prior Publication Data

US 2003/0002580 A1 Jan. 2, 2003

Related U.S. Application Data

(63) Continuation of application No. PCT/JP01/08069, filed on Sep. 17, 2001.

(30) Foreign Application Priority Data

Sep. 18, 2000 (JP) .............................. 2000-282696

(51) Int. Cl.
 *G06K 9/00* (2006.01)
 *G06K 9/36* (2006.01)
(52) U.S. Cl. ........................ 382/149; 382/239; 382/240
(58) Field of Classification Search ................ 382/149, 382/239, 240
 See application file for complete search history.

(56) References Cited

U.S. PATENT DOCUMENTS 5,111,306 A * 5/1992 Kanno et al. ................ 358/403
5,182,775 A * 1/1993 Matsui et al. ................ 382/152
5,917,934 A * 6/1999 Chiu et al. ................... 382/149

FOREIGN PATENT DOCUMENTS

| JP | 62-173874 A | 7/1987 |
| JP | 01-155477 A | 6/1989 |
| JP | 02-008967 A | 1/1990 |
| JP | 02-204872 A | 8/1990 |
| JP | 02-211586 A | 8/1990 |
| JP | 02-263269 A | 10/1990 |
| JP | 04-123270 A | 4/1992 |
| JP | 04-333987 A | 11/1992 |
| JP | 05-242221 A | 9/1993 |
| JP | 06-325141 A | 11/1994 |
| JP | 09-259250 A | 10/1997 |

* cited by examiner

*Primary Examiner*—Bhavesh M Mehta
*Assistant Examiner*—Jonathan Schaffer
(74) *Attorney, Agent, or Firm*—Frishauf, Holtz, Goodman & Chick, P.C.

(57) ABSTRACT

An image data file management system according to the present invention includes a plurality of inspection sections which acquire an image of a subject and acquire various kinds of inspection results by performing image processing with respect to image data of the subject, and an image server which stores respective sets of the image data acquired by the respective inspection sections in association with information of the subject.

11 Claims, 13 Drawing Sheets

FIG. 7

| Record No. | Wafer ID | Lot ID | Product class ID | Process ID | Date | Time | Type of image | Inspection result | Number of times of rework | Elimination flag | Backup medium ID |
|---|---|---|---|---|---|---|---|---|---|---|---|

FIG. 8A

| Record No. | Product class ID | Product class name |
|---|---|---|

FIG. 8B

| Record No. | Process ID | Process name |
|---|---|---|

FIG. 8C

| Record No. | Product class ID | Process ID |
|---|---|---|

FIG. 8D

| Record No. | Lot ID | Process ID | Number of times of rework | Disposal flag |
|---|---|---|---|---|

FIG. 8E

| Record No. | Backup medium ID | Backup start date | Backup end date | Possobolity of recycle |
|---|---|---|---|---|

FIG. 12

| Record No. | Wafer ID | Lot ID | Product class ID | Process ID | Date | Time | Type of image | Inspection result |
|---|---|---|---|---|---|---|---|---|

| Number of times of rework | Elimination flag | Back medium ID | Number of linked images | Linked image ID | Linked image ID | Linked image ID | ... |
|---|---|---|---|---|---|---|---|

FIG. 13

| Record No. | Linked image ID | Linked image record No. | Image range coordinate | Image magnification | Apparatus ID |
|---|---|---|---|---|---|

IMAGE DATA FILE MANAGEMENT SYSTEM AND METHOD

CROSS-REFERENCE TO RELATED APPLICATIONS

This is a Continuation Application of PCT Application No. PCT/JP01/08069, filed Sep. 17, 2001, which was not published under PCT Article 21(2) in English.

This application is based upon and claims the benefit of priority from the prior Japanese Patent Application No. 2000-282696, filed Sep. 18, 2000, the entire contents of which are incorporated herein by reference.

BACKGROUND OF THE INVENTION

1. Field of the Invention

The present invention relates to an image data file management system and method for managing image data picked up by an inspection apparatus or the like.

2. Description of the Related Art

For example, as a defect inspection apparatus for a semiconductor wafer or the like, an apparatus which picks up an image of a wafer plane by an image pickup section, applies image processing to a picked-up image by a computer in order to extract a defect and records image data subjected to image processing in a storage section has been put into practical use.

Further, in such defect inspection apparatus, since the quantity of data processed in accordance with each image processing becomes very large, there has been considered that an image server having a backup function is connected and an image data file is recorded on the image server side.

In the method for recording the image data file based on the conventional idea, however, since the image data in the storage section of the defect inspection apparatus is stored in a backup section on the image server side as it is, a large storage capacity is required on the server side, which becomes economically disadvantageous. Furthermore, since management of the image data file stored on the server side is not taken into consideration, there is a problem that the backup data is rarely utilized advantageously.

BRIEF SUMMARY OF THE INVENTION

It is an object of the present invention to provide an image data file management system and method which can efficiently manage image data.

According to the present invention, there is provided an image data file management system comprising: a plurality of inspection sections which acquire an image of a subject and acquire various kinds of inspection results by performing image processing with respect to image data of the subject; and an image server which stores respective sets of the image data acquired by the respective inspection sections in association with information of the subject.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a view showing a record concerning image data registered in a data base according to the first embodiment of the present invention;

FIGS. 8A to 8E are views showing respective records registered in the data base according to the first embodiment of the present invention;

FIG. 12 is a view showing a record concerning image data registered in a data base according to the second embodiment of the present invention;

FIG. 13 is a view showing a record concerning image data linked to the record illustrated in FIG. 12 according to the second embodiment of the present invention;

DETAILED DESCRIPTION OF THE INVENTION

Embodiments according to the present invention will now be described with reference to the accompanying drawings.

Figure 1:
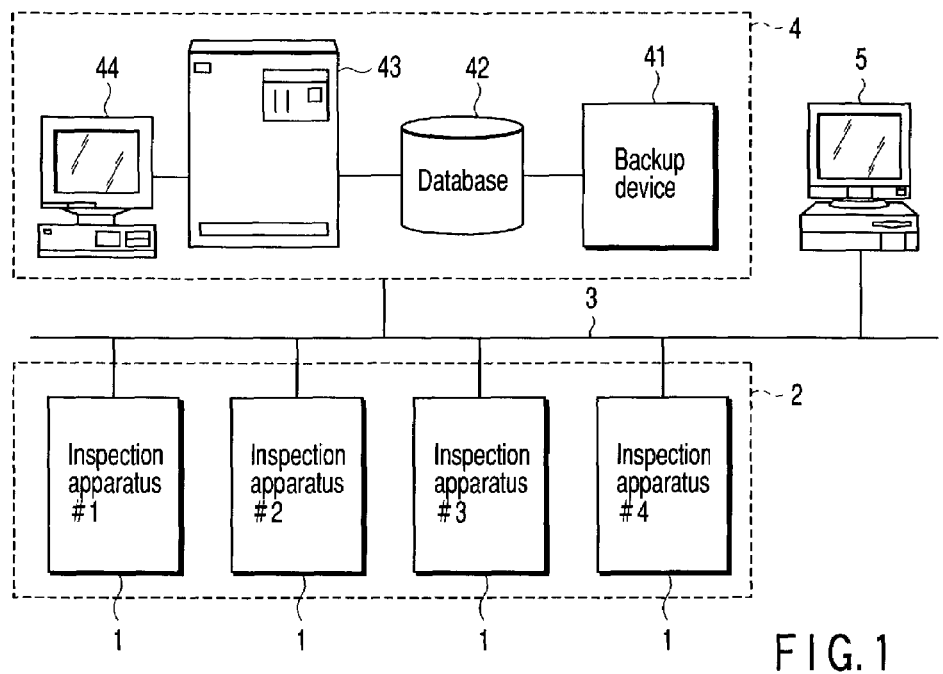
FIG. 1 is a view showing a schematic structure of an image data file management system according to a first embodiment of the present invention.

FIG. 1 is a view showing a schematic structure of an image data file management system according to a first embodiment of the present invention. In FIG. 1, a plurality of (a total of four in the illustrated example) inspection apparatuses 1 (#1 to #4) which are client apparatuses perform various kinds of inspections such as a macro inspection, a pattern inspection, a microscopic inspection or an SEM inspection on each stage of a pre-process and a post-process of a semiconductor wafer production line. The inspection apparatus 1 is, for example, a defect inspection apparatus or the like which picks up an image of, e.g., a wafer plane by a non-illustrated image pickup section and performs image processing on the picked-up image in order to detect a defective part. The respective inspection apparatuses 1 (#1 to #4) are arranged in a clean room 2.

Moreover, the respective inspection apparatuses 1 (#1 to #4) are connected to a LAN 3 used for communication. Also, to the LAN 3 are connected an image server section 4 and a retrieval terminal 5. The image server section 4 has a backup device 41, a data base 42, a hard disk 43 and a server main body 44. The retrieval terminal 5 is arranged outside the clean room 2 and retrieves stored content in the image server section 4.

In the image data file management system having such a structure, each inspection apparatus 1 performs defect inspection processing such as a macro inspection, a pattern inspection, a microscopic inspection or an SEM inspection with respect to a wafer (wafer to be inspected) which is a target of inspection. For example, #1 is a macro inspection apparatus, #2 is a pattern inspection apparatus, #3 is a microscopic inspection apparatus and #4 is an SEM inspection apparatus.

Figure 2:
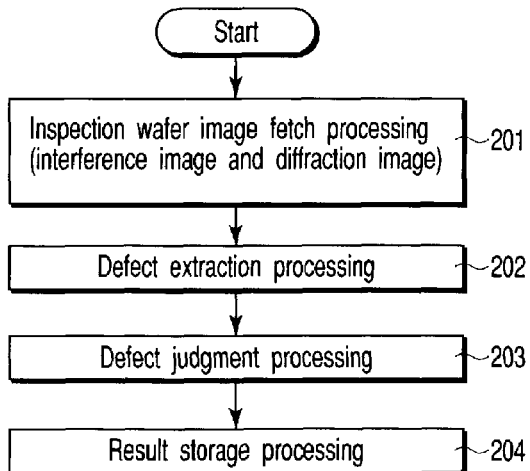
FIG. 2 is a flowchart showing a procedure of inspection processing on an inspection apparatus side according to the first embodiment of the present invention.

FIG. 2 is a flowchart showing a procedure of inspection processing on the macro inspection apparatus 1 (#1) side. At step 201, the inspection apparatus 1 (#1) first picks up an image of a surface of the wafer to be inspected by the image pickup section and fetches its macro inspection image data. The image data to be fetched is respective sets data of an interference image and a diffraction image.

Subsequently, the inspection apparatus 1 (#1) detects a defect of the wafer by using respective sets of data of the interference image and the diffraction image at step 202 and carries out defect judgment processing at step 203. Then, an inspection result indicating whether the wafer to be inspected is good, namely, whether the wafer to be inspected is acceptable is obtained in the inspection apparatus 1 and processing for storing image data according to this result is performed at step 204. Similarly, in the inspection apparatus (#2), the microscopic inspection apparatus (#3) and the SEM inspection apparatus (#4) other than the above inspection apparatus 1, judgment of the quality of a defect or inspection of a type of the defect or the like are carried out by enlarging the defect on the wafer to be inspected. Processing for storing micro image data is effected in accordance with this inspection result of the defect.

At this moment, the macro inspection apparatus 1 (#1) outputs respective files of interference image data, diffraction image data and inspection result data. Assuming that the inspection apparatus 1 (#1) has a capability of processing up to 380 images per hour, the capacity reaches 1558 MB in one hour since one image corresponds to 4.1 MB when it is not compressed. If this processing is performed 24 hours a day for one month (30 days), the capacity reaches 1121.76 GB. Therefore, when actually storing image data, many hard disks each having a capacity of approximately 1 TB must be prepared, which is disadvantageous in terms of cost.

Thus, in the first embodiment, the result storage processing in the respective inspection apparatuses 1 (#1 to #4) is executed by using a hard disk 43 and a backup device 41 of an image server section 4 connected through a LAN 3. As a result, the capacity of the hard disk in the inspection apparatus 1 is minimized, and the day-to-day operation and the operation of the data after backup are facilitated.

Figure 3A:
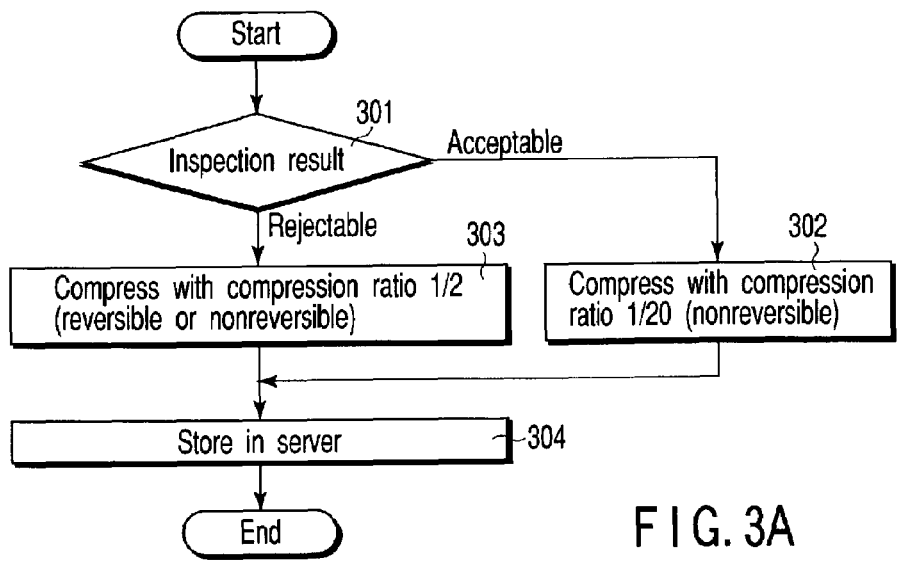
FIG. 3A is a flowchart showing a procedure of result storage processing according to the first embodiment of the present invention in detail.

FIG. 3A is a flowchart showing a procedure of the result storage processing at step 204 in FIG. 2 in detail. At step 301, the macro inspection apparatus 1 (#1) makes judgment upon whether an inspection result is acceptable as judgment on the quality of the wafer. Here, if it is determined as acceptable, the macro inspection apparatus 1 (#1) performs high compression (which is called nonreversible compression) on macro image data (the interference image and the diffraction image) of the wafer determined as acceptable with, e.g., a compression ratio of 1/20. That is because the wafer image data with the good quality determined as acceptable is rarely referred to later and the reversibility for completely restoring the original image data picked up by the image pickup section of the inspection apparatus 1 is not required.

In addition, if it is determined as rejectable at step 301, the inspection apparatus 1 performs low compression with a compression ratio of, e.g., 1/2 or non-compression (which is called reversible compression) to the image data (interference image and the diffraction image) of the wafer determined as rejectable. That is because the image data of the wafer with the poor quality determined as rejectable is often referred to when analyzing a serious defect which leads to rework or disposal in detail and the reversibility for completely restoring the image data picked up by the image pick up section of the inspection device 1 is required. Then, at step 304, the inspection apparatus 1 (#1) stores the image data of each wafer subjected to compression processing at steps 302 and 303 in a hard disk 43 of the image server section 4 through the LAN 3.

Figure 3B:
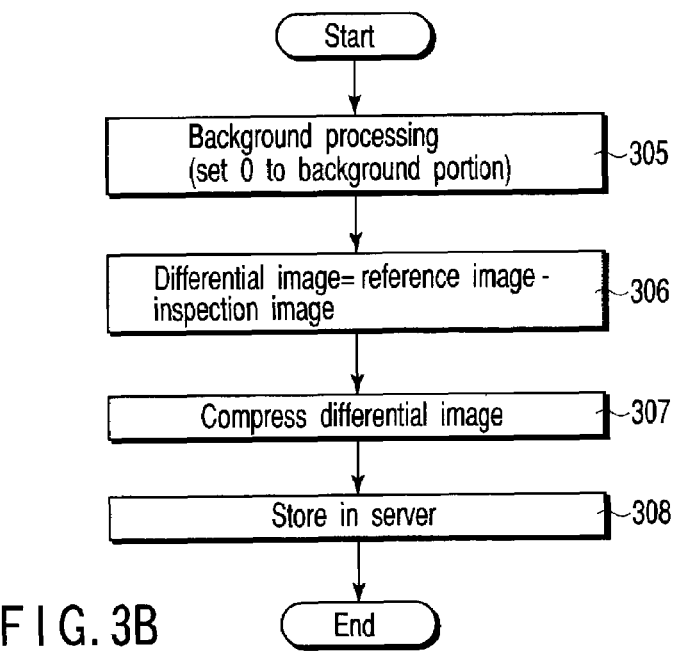
FIG. 3B is a flowchart showing a procedure of image data compression processing according to the first embodiment of the present invention.
Figure 4:
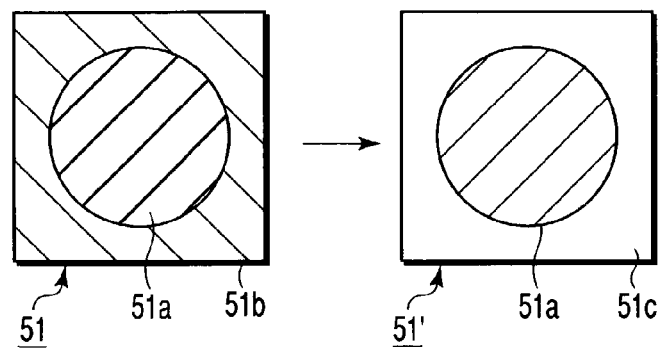
FIG. 4 is a view for illustrating compression and storage of image data according to the first embodiment of the present invention.

FIG. 3B is a flowchart showing a procedure of compression processing for the image data at steps 302 and 303. At first, background processing is first carried out at step 305. In this background processing, inspection image data 51 including a wafer stage is created by the macro inspection apparatus 1 (#1) as shown in FIG. 4, and a wafer portion 51a and a background portion (wafer stage) 51b in the inspection image data 51 are separated. Then, in the inspection image data 51, the background portion 51b is replaced with a background portion 51c having a predetermined brightness value (for example, a brightness value 0) by the macro inspection apparatus 1 (#1), and inspection image data 51' is created. The method for separating the wafer portion 51a and the background portion 51b may be manually or automatically set.

Subsequently, at step 306, the macro inspection apparatus 1 (#1) carries out arithmetic operation processing of exclusive OR of the master (reference) image data 52 and the inspection image data 51' and obtains a differential image data 53. The inspection apparatus 1 fetches the master image 52 which can be such a reference as shown in FIG. 5 which is previously reversibly compressed and stored in the hard disk 43 of the image server section 4 from the hard disk 43 through the LAN 3.

Figure 5:
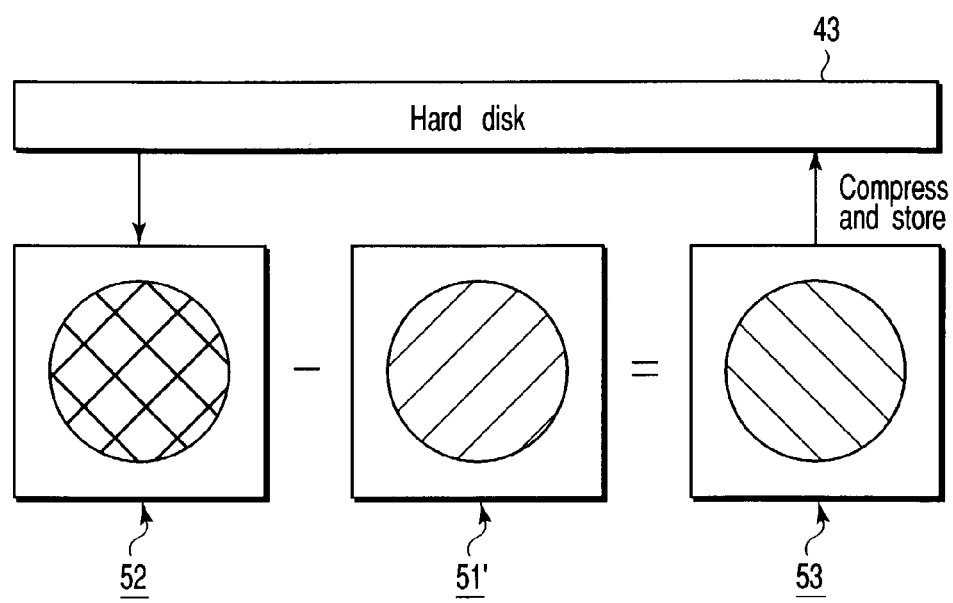
FIG. 5 is a view for illustrating compression and storage of image data according to the first embodiment of the present invention.

As shown in FIG. 5, the macro inspection apparatus 1 (#1) subtracts the inspection image data 51' subjected to background processing from the fetched master image data 52 and obtains the differential image data 53. Then, at step 307, the inspection apparatus 1 compresses the differential image data 53 with a compression ratio set at steps 302 and 303. Then, at step 308, the inspection apparatus 1 stores the compressed data in the hard disk 43 of the image server section 4 through the LAN 3 as illustrated in step 304.

Additionally, as another method for compressing the image data, there is also one which stores a brightness value with which the master (reference) image is substituted and a standard deviation value with respect to the brightness value of the master image in the hard disk 43 in advance, and determines a difference between the master image and the inspection image as a defect and compresses and stores only the difference if the difference is beyond a range of the standard deviation value. According to such a compression and storage method, since it is often the case that the brightness value of the difference between the master image and the inspection image is in the vicinity of 0, the compression efficiency (which is not restricted to JPEG) can be exponentially increased.

Additionally, in the pattern detection apparatus (#2), the microscopic inspection apparatus (#3) and the SEM inspection apparatus (#4) which use an enlarged image (micro image) for inspection, the micro image data concerning a defect determined as acceptable (no problem) is likewise subjected to high compression, and the micro image data concerning a defect determined as rejectable (having a problem) is subjected to low compression.

In this manner, in case of storing the image data from the inspection apparatus 1 in the hard disk 43, the capacity of the hard disk 43 may be insufficient when a quantity of supplied data increases. As a countermeasure, there is taken a method by which the capacity of the hard disk 43 is constantly monitored and the compression ratio in the inspection apparatus is changed or settings of compression and storage are changed by a file system on the hard disk 43 side when the capacity becomes below a predetermined value. Besides, this is used a method which prepares another hard disk as a spare and a storage place is changed to this hard disk.

With the above-described technique, since the image data determined as rejectable (having a problem) as a result of the defect inspection in the inspection apparatus 1 is stored by low compression processing with the compression ratio of approximately ½, this image data can be restored as an excellent wafer image which is substantially equivalent to the original image picked up by the image pickup section of the inspection apparatus 1 in the subsequent defect analysis processing. Further, although the image data determined as acceptable (no problem) is stored by high compression processing, since it is considered that most of wafers are usually determined as acceptable, the LAN load (for example, a communication speed) when transmitting the image data to the image server section 4 through the LAN 3 can be greatly reduced by applying high compression processing on many sets of such image data to which the complete restoration property is not requested and which are determined as acceptable, and the utilization ratio of the image server 4 can be increased.

Figure 6:
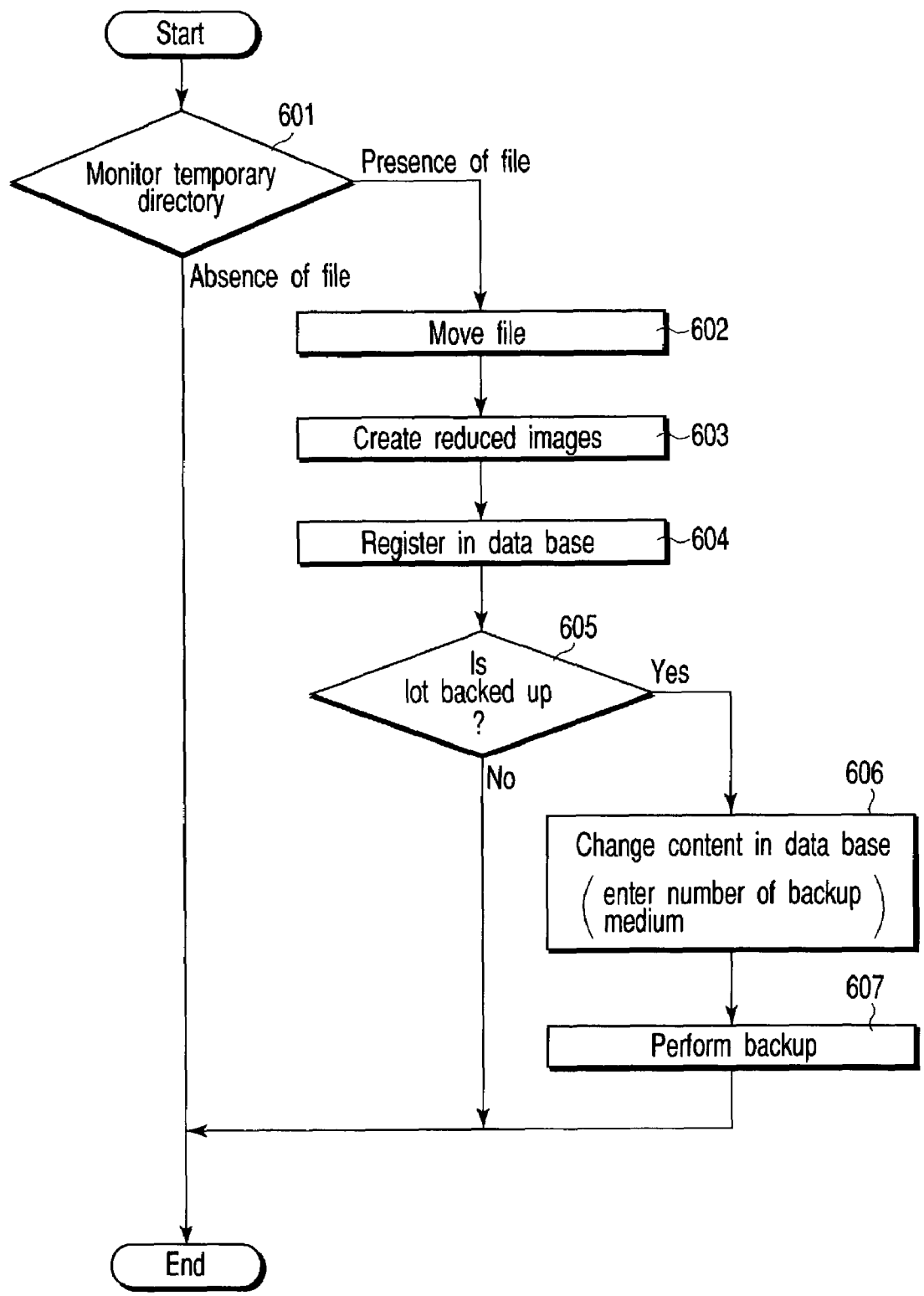
FIG. 6 is a flowchart showing a processing procedure on a server side according to the first embodiment of the present invention.

FIG. 6 is a flowchart showing a processing procedure on the server side. Processing on the image server section 4 side is executed along the flowchart shown in FIG. 6. The image data determined as acceptable or rejectable by the processing in the above-described inspection apparatus 1 is stored in the form of a file at a predetermined directory (temporary directory) in the hard disk 43 in the image server section 4.

From this state, at step 601, the server main body 44 periodically monitors a temporary directory of the hard disk 43. Here, if a file does not exist, the server main body 44 temporarily stops processing and again repeats monitoring. Furthermore, if a file exists, at step 602, the server main body 44 classifies (moves) the image data to a directory structure based on a file name of the file in accordance with predetermined rules. If the file has names such as a product class ID, a process ID or a lot ID, the server main body 44 analyzes the names and extracts each item as information.

Then, the server main body 44 looks up in a directory of the hard disk 43 based on the information, and classifies (moves) the file of the image data to a corresponding directory hierarchical structure (under the product class ID, the process ID and the lot ID). Moreover, when there is no corresponding directory, the server main body 44 creates a directory based on the information and classifies (moves) the file of the image data.

Subsequently, at step 603, the server main body 44 creates and stores reduced images of the image data in accordance with classification of the directory structure. These reduced images are used for thumb nail display of the inspection image by an instruction from the retrieval terminal 5 by an operator, and previously created in order to facilitate calling. These images are created from corresponding image data by performing thinning-out processing of pixels.

Then, at step 604, the server main body 44 registers data classified (moved) to the directory structure in the data base 42. In this case, as shown in FIG. 7, a record relative to the image data in the data base 42 has respective fields of "Record No.", "Wafer ID", "Lot ID", "Product class ID", "Process ID", "Date", "Time", "Type of image", "Inspection result", "Number of times of rework", "Elimination flag" and "Backup medium ID". In this record, information is added and recorded in these fields based on the content of an inspection result in the inspection device 1.

The field of "Product class ID" of the record shown in FIG. 7 is associated with each information of "Record No.", "Product class ID" and "Product class name" as shown in FIG. 8A. The field of "Process ID" of the record shown in FIG. 7 is associated with each information of "Record No.", "Process ID" and "Process name" as shown in FIG. 8B, and the record concerning the process information in accordance with each product class of the wafer is associated with each information of "Record No.", "Product class ID" and "Process ID". Information indicating which process is used for processing the wafer of a given product class is recorded.

In addition, in the field of "Type of image" of the record shown in FIG. 7, information indicating which one of the interference image and the diffraction image that the image fetched by the macro inspection apparatus 1 (#1) corresponds to be inputted. In the field of "Inspection result" of the record shown in FIG. 7, information indicating that the inspection result is acceptable or rejectable is inputted.

As to the field of "Number of times of rework" of the record shown in FIG. 7, a number of times of rework is updated every time the wafer in that record is subjected to rework processing (reprocessing). FIG. 8D shows a record concerning "Number of times of rework" in accordance with each lot of the wafer. As shown in FIG. 8D, the field of "Number of times of rework" of the record shown in FIG. 7 is associated with "Record No.", "Lot ID", "Process ID", "Number of times of rework" and "Disposal flag". In the field of "Disposal flag", data when the image data is subjected to disposal is recorded.

When the image data of the record is deleted from both the hard disk 43 and a backup medium in the backup device 41 of the image server section 4, information indicative of this deletion is inputted to the field of "Elimination flag" of the record shown in FIG. 7.

When the image data of the record shown in FIG. 7 is backed up from the hard disk 43 to a backup medium in the backup device 41 of the image server section 4, a serial number given to this backup medium is inputted as an ID to the field of "Backup medium ID" of the record shown in FIG. 7. FIG. 8E shows a record concerning a backup medium. The field of "Backup medium ID" of the record shown in FIG. 7 is associated with "Record No.", "Backup medium ID", "Backup start date", "Backup end date" and "Possibility of recycle" as shown in FIG. 8E. That is, here, the record managing a backup medium is defined, and the field of "Possibility of recycle" indicates whether all data in the backup medium is completely erased and that medium can be again used. A condition of enabling recycle is that all of "Elimination flags" having the same backup medium ID in the record shown in FIG. 7 are eliminated.

Then, at step 605 shown in FIG. 6, the server main body 44 makes judgment upon whether backup of the lot of the wafer is possible. In this case, the server main body 44 makes reference to data in the data base 42 illustrated in FIGS. 8C and 8D. When the server main body 44 completes all the processes with respect to the product class of the wafer concerning that one lot or confirms that disposal is determined in the middle of the process, it advances to step 606. Also, the server main body 44 changes the content in the data base 42 and determines which backup medium is used for backup by filling in "Backup medium ID" of the record shown in FIG. 7. Then, at step 607, the server main body 44 carries out backup of the corresponding image data file in the had disk 43 to the backup medium in the backup device 41. It is to be noted that the image data file which is backed up in the backup device 41 does not include reduced images of the image data.

In this case, as the backup medium in the backup device 41, a tape or a semiconductor memory is used, and the image data file is backed up together with the directory structure. Further, the data base 42 manages which product class the data of the wafer belongs to and which medium this data is backed up to, and manages the backed-up image data file by imparting an identification code such as a bar code or a serial number. Furthermore, the backed-up image data file is deleted from the hard disk 43 by the server main body 44, and an identifier such as a serial number is added as an item of the image data file in the data base 42. Furthermore, the data base 42 manages which image data file is stored in accordance with each backup medium. When all the files in the medium are deleted, the data base 42 manages in such a manner that this medium can be recycled.

Subsequently, concrete description will be given as to the relationship between the hard disk 43 and the backup device 41. For example, in case of a semiconductor production line which processes 30,000 wafers per month, assuming that all wafers are excellent products, the capacity of the hard disk 43 required for the macro inspection apparatus 1 (#1) for one month can be expressed as follows:

30,000 (wafers)×4.1 (MB)×2(number of images/wafer)×10(number of processes)×0.05(compression ratio 1/20)=123

In addition, assuming that wafers put into the production line one month ago (30 days) are processed in the first-in last-out manner and the delay is up to 15 days in particular, the capacity of the hard disk 43 with the safety being taken into consideration can be estimated as follows:

123 (GB)×(1+(15 (days)/30 (days)))=184.5(GB)

Additionally, the capacity per day can be expressed as follows:

123 (GB)/30 (days)=4.1 (GB)

After elapse of the first one month, from the next day, data of 4.1 GB is backed up by the backup device 41 every day. In this case, if AITs (Advanced Intelligent Tapes) each of which has the capacity of 100 GB are used as backup mediums, using approximately 1.23 tapes (4.1 (GB)×30 (days)=123 (GB)) per month can suffice. Further, presuming that the backup data is stored for one year, preparing approximately 15 tapes (1.23 (tapes)×12 (months)=14.76) can suffice.

On the other hand, the retrieval terminal 5 can display a list of inspection results in a non-illustrated display section by using reduced images of the image data created in accordance with each classification of the directory structure which is not backed up but remains in the hard disk 43 and display in the display section the correspondence relationship between the image data file and the backup medium based on the storage content in the data base 42 and the retrieval or inspection status of the backup medium or the like.

Figure 9:
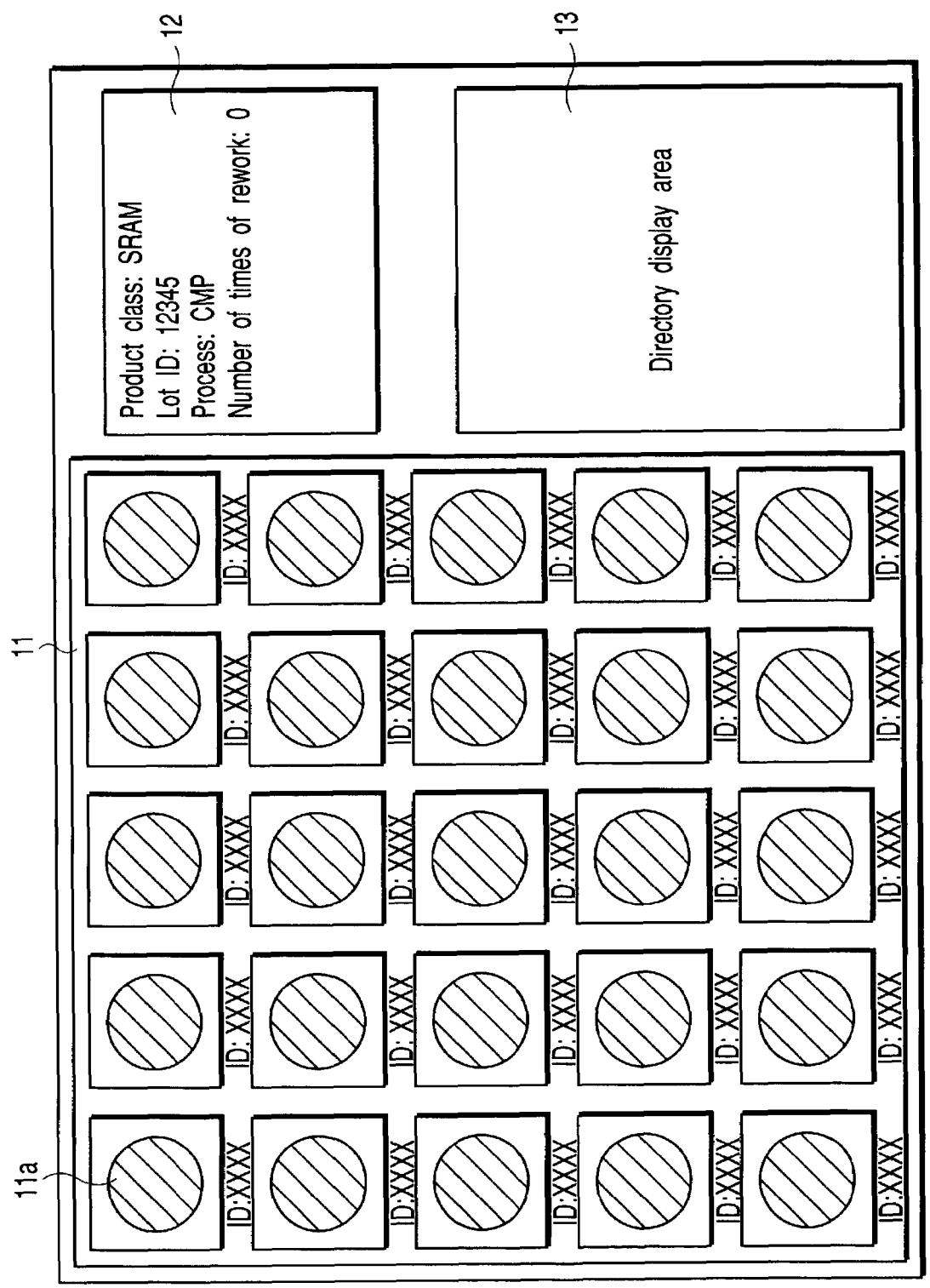
FIG. 9 is a view showing an example of display of a list of inspection images according to the first embodiment of the present invention.

FIG. 9 is a view showing an example of display of a list of inspection images by the retrieval terminal 5. The display screen of the retrieval terminal 5 shown in FIG. 9 has an inspection image display area 11 for displaying a list of many aligned reduced images 11a corresponding to the image data as an inspection result, an area 12 for displaying product classes or processes of the overall lots or all strokes, and a directory display area 13. It is to be noted that records of the image data or data of reduced images which are not required at all are deleted by the periodical maintenance in the data base 42.

Although description has been given as to an example in which the image server section 4 is connected to a plurality of the inspection apparatuses 1 through the LAN 3 in the above-described embodiment, it is possible to apply a system in which the inspection apparatus 1 and the image server section 4 are connected in the one-to-one relationship. Furthermore, a system having a function of the image server section 4 in the inspection apparatus 1 can be likewise applied.

Figures 10, 11:
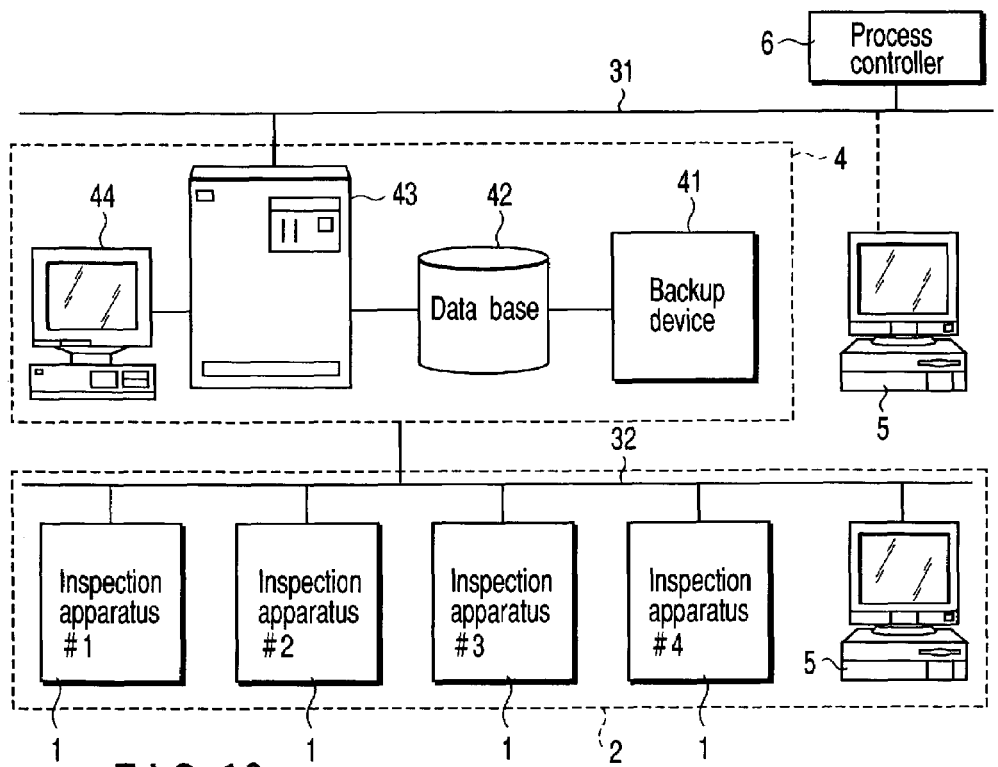
FIG. 10 is a view showing a schematic structure of an image data file management system according to a second embodiment of the present invention.
FIG. 11 is a view showing an example of an inspection result file according to the second embodiment of the present invention.

FIG. 10 is a view showing a schematic structure of an image data file management system according to a second embodiment of the present invention. In FIG. 10, like reference numerals denote parts equal to those in FIG. 1. In FIG. 10, a process controller 6 and the hard disk 43 of the image server section 4 are connected to a LAN 31 for a line in a factory. The process controller 6 manages a series of processes for manufacturing a wafer in the factory. Further, in the clean room 2, the respective inspection apparatuses 1 (#1 to #4 and others) and the retrieval terminal 5 are connected to a LAN 32 for transferring images. Furthermore, the image server section 4 is connected to the LAN 32. It is to be noted that the retrieval terminal 5 may be configured to be connected to the LAN 31.

Inherent information of each wafer as an inspection target (inspection processes, product classes or the like) is stored in a recipe area (or the process controller 6) in the hard disk 43 of the image server section 4. The respective inspection apparatuses 1 (#1 to #4 and others) carry out the macro inspection, the pattern inspection, the microscopic inspection (micro inspection) and the SEM inspection of each wafer. Moreover, to the LAN 32 are connected non-illustrated inspection apparatuses such as an overlap inspection apparatus, a film thickness inspection apparatus or an extraneous material inspection apparatus. The respective inspection devices 1 (1 to #4 and others) download the necessary inherent information of each wafer from the recipe area (or the process controller 6) and perform inspection in accordance with a created recipe.

After completion of inspection, the respective inspection apparatuses 1 (#1 to #4 and others) supply an inspection result file in which an inspection result is added to the inherent information to a temporary directory in the hard disk 43 of the image server 4 through the LAN 32 for transferring images. The server main body 44 of the image server 4 monitors the temporary directory in the hard disk 43, converts by using a decoder the inspection result supplied to the temporary directory, registers it in the data base 42, and stores it in the recipe area (or the process controller 6) in the hard disk 43 after performing history management.

At this moment, the server main body 44 extracts the image data from the converted inspection result and classifies (moves) the image data to a directory structure in the hard disk 43 (or the process controller 6) in accordance with predetermined rules. The server main body 44 creates and stores reduced images of the image data in accordance with each classification of the directory structure. Moreover, the server main body 44 can make judgment upon whether a defect detected by a given inspection apparatus 1 is also detected by another inspection apparatus 1 by comparing information indicative of largeness of the defect which can be obtained based on a coordinate of the defect indicated by the image data in the hard disk 43 with a coordinate of the defect indicated by the image data extracted from the inspection result of the inspection result file from another inspection apparatus 1.

FIG. 11 is a view showing an example of the inspection result file. This inspection result file consists of inherent information 111 with respect to the wafer and an inspection result 112 in each of the inspection apparatuses 1 (#1 to #4 and others). Information of, e.g., inspection processes or product classes of respective wafers is written in the inherent information 111. In the inspection result 112 are written a position of a defect generated to a wafer on an image (coordinate), a defect name, size of a defect in vertical and horizontal directions, a name of the inspection apparatus 1 which performs inspection, a format type of a file or the like. The decoder of the server main body 44 converts the information of the inspection result in accordance with the format type and registers the obtained result in the data base 42.

FIG. 12 is a view showing a record concerning the image data registered in the data base 42. As shown in FIG. 12, a record concerning the image data registered in the data base 42 has the respective fields of "Record No.", "Wafer ID", "Lot ID", "Product class ID", "Process ID", "Date", "Time", "Type of image", "Inspection result", "Number of times of rework", "Elimination flag", "Backup medium ID", "Number of linked images" and a plurality of "Linked image ID". In this record, information is additionally recorded in these fields based on the content of the inspection result obtained by the inspection apparatus 1. In this manner, a number of sets of image data linked to the image data and the respective IDs (file names) are stored in the record of the data base 42.

FIG. 13 is a view showing a record concerning the image data linked to the record illustrated in FIG. 12. The record concerning the linked image data registered in the data base 42 has respective fields of "Record No.", "Linked image ID", "Linked image record No.", "Image range coordinate", "Image magnification" and "Apparatus ID" as shown in FIG. 13. This record is additionally recorded in the data base 42 in accordance with "Linked image ID" added in the record illustrated in FIG. 12.

Figure 14:
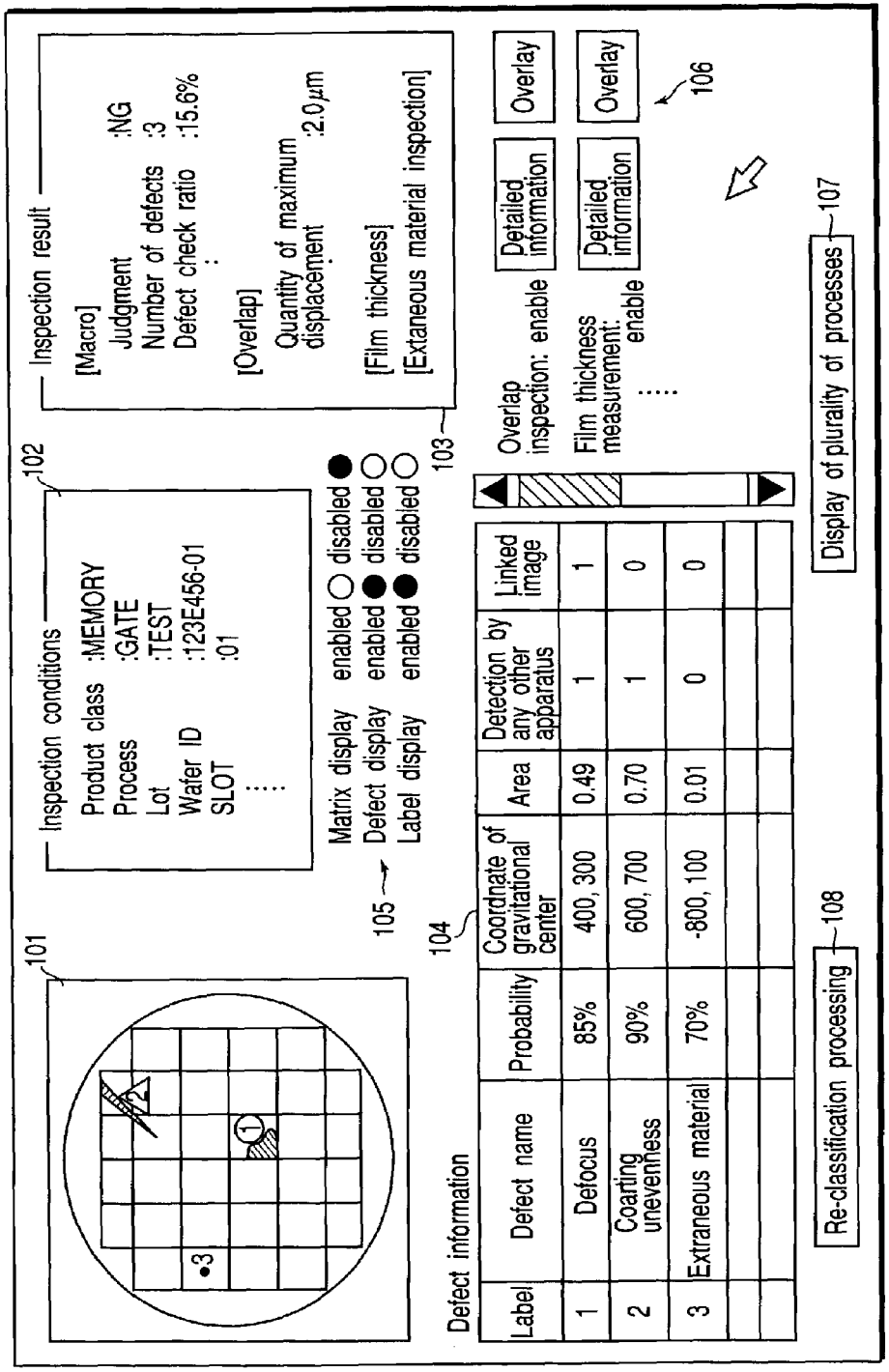
FIG. 14 is a view showing a first display example in a display section of a retrieval terminal according to the second embodiment of the present invention.

FIG. 14 is a view showing a first display example in the display section of the retrieval terminal 5. The server main body 44 retrieves a record in the data base 42 in accordance with the content of an instruction from the retrieval terminal 5, reads necessary information of the inspection result (image data of the wafer or the like) and information of the inspection conditions (inherent information of the wafer) from the hard disk 43 (or the process controller 6), supplies them to the retrieval terminal 5 through the LAN 32 (or the LAN 31). The retrieval terminal 5 displays the received information in the display section as shown in FIG. 14.

FIG. 14 shows a display example of the macro inspection result obtained by the macro inspection apparatus 1 (#1). Information of a wafer image 101, inspection conditions 102, an inspection result 103, defect information 104 or the like is displayed in the display section of the retrieval terminal 5. In the wafer image 101, an image showing a detected defect is displayed on an image showing the entire shape of the wafer, and an inherent number (label) is given to each defect. In the inspection conditions 102, the inherent information of the wafer is displayed in characters. In the inspection result 103, the inspection result obtained by each of the inspection apparatuses 1 (#1 to #4 and others) is displayed in characters.

The defect information 104 consists of items of "Label", "Defect name", "Probability", "Coordinate of gravitational center", "Area", "Detection by other apparatuses" and "Linked image". "Label" indicates a number given to each defect in the wafer image 101. "Defect name" indicates a type of a defect. "Probability" indicates the probability that the detected defect is a true defect. "Coordinate of gravitational center" indicates a position of the gravitational center of the defective image on the wafer image. In "Detection by other devices", "1" is displayed when the defect is also detected by other inspection apparatuses 1 (#2 to #4 and others), and "0" is displayed when the defect is not detected. In "Linked image", "1" is displayed when there is image data linked to the image data of the wafer in the data base 42, and "0" is displayed when there is no such image data.

Additionally, for example, when "Detection by other devices" is "1" and "Linked image" is "1" as with the defect information that "Label" is "1", a number of the defect image in the wafer image 101 is encircled by a circle. Further, for example, when "Detection by other devices" is "1" and "Linked image" is "0" as with the defect information that "Label" is "2", a number of the defect image in the wafer image 101 is encircled by a triangle. Furthermore, for example, when "Detection by other devices" is "0" and "linked image" is "0" as with the defect information that "Label" is "3", a number of the defect information in the wafer image 101 is not encircled.

Moreover, selection settings 105 such as matrix display, defect display, label display or the like are displayed in the display section of the retrieval terminal 5. When "Enabled" is set in "Matrix display" of the selection settings 105, a shot is displayed in the wafer image 101. When "Disabled" is set, it is not displayed. When "Enabled" is set in "Defect display" of the selection settings 105, a defect image on the wafer image 101 is displayed in an emphatic color. When "Disabled" is set in the same item, the defect image is displayed in a regular color. When "Enabled" is set in "Label display" of the selection settings 105, a number of the defect image on the wafer image 101 is displayed. When "Disabled" is set in the same item, the number is not displayed.

Moreover, in the display section are displayed respective buttons 106 for performing detailed information display of overlap inspection, film thickness measurement or the like and overlay display, a button 107 for displaying images obtained by a plurality of processes which will be described later, a button 108 for carrying out later-described reclassification processing, and others.

Figure 15:
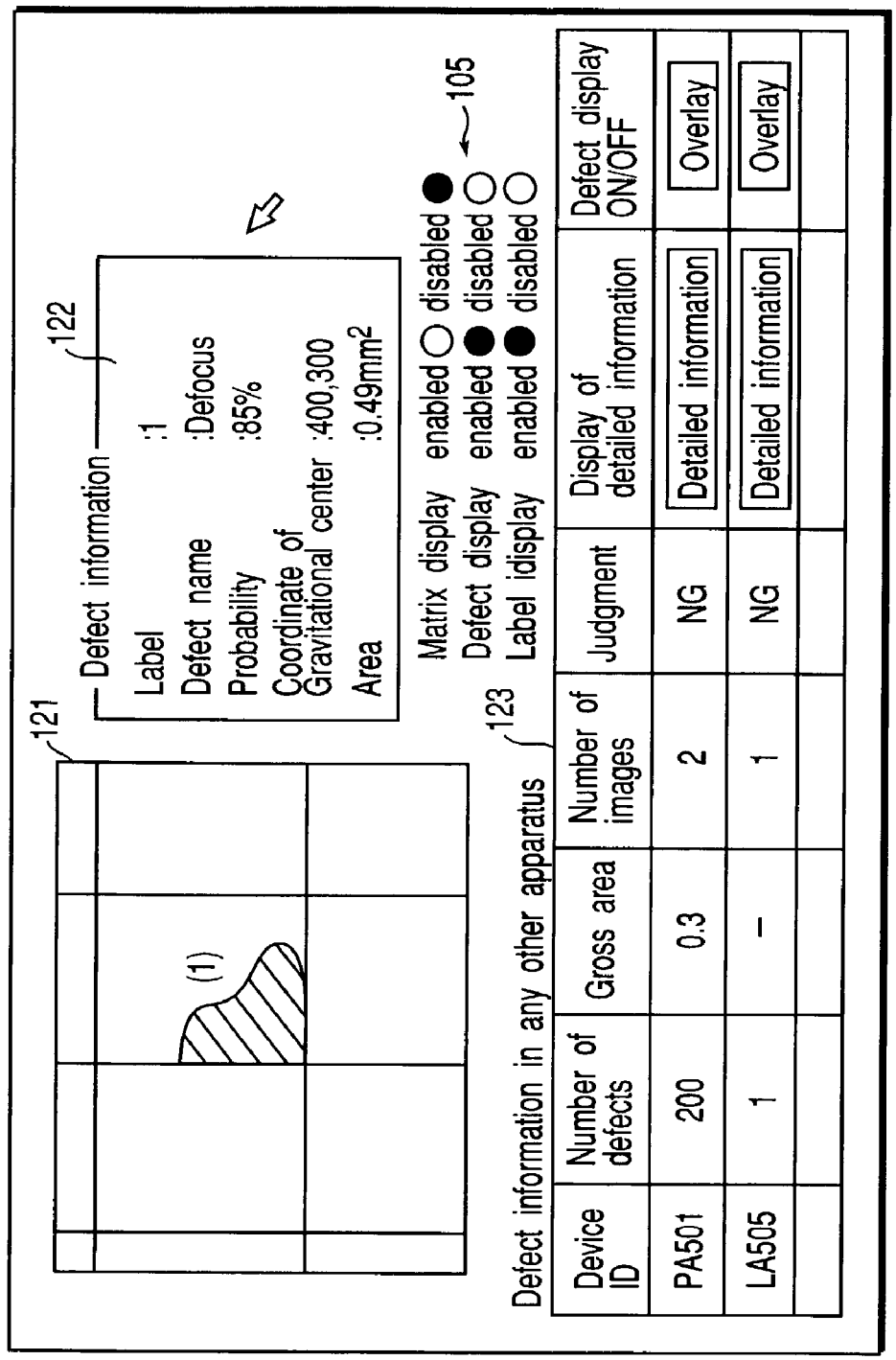
FIG. 15 is a view showing a second display example in the display section of the retrieval terminal according to the second embodiment of the present invention.

FIG. 15 is a view showing a second display example in the display section of the retrieval terminal 5. FIG. 15 shows a display example after performing an operation (click operation) for selecting a line of "Label" as "1" of the defect information 104 shown in FIG. 14 by using a non-illustrated mouse or keyboard in the retrieval terminal 5 by an operator. The server main body 44 retrieves a record of the data base 42 in accordance with the operation from the retrieval terminal 5, reads the information of the inspection result in other apparatuses 1 (#2 to #4 and others) from the hard disk 43 (or the process controller 6), and supplies it to the retrieval terminal 5 through the LAN 32 (or the LAN 31). The retrieval terminal 5 displays the received information in the display section as shown in FIG. 15.

In the display section is displayed information such as an enlarged image of the wafer 121, the defect information 122, the defect information 123 in other apparatuses and the like. In the enlarged image of the wafer 121, the enlarged wafer image obtained by the macro inspection is displayed with the defect image of the selected "Label" being "1" mainly included. As a result, an operator can see the defect which requires observation in the form of an enlarged image. In the defect information 122, information indicated by the line of "Label" as "1" of the defect information 104 in FIG. 14 is displayed in characters.

The defect information in other devices 123 consists of items of "Apparatus ID", "Number of defects", "Gross area", "Number of images", "Judgment", "Detailed information display" and "Defect display ON/OFF". "Apparatus ID" indicates apparatus IDs of other inspection apparatuses 1 (#2 to #4 and others). "Number of defects" indicates a number of defects on the wafer detected by the inspection apparatus 1 having the apparatus ID. "Gross area" indicates a gross area of the defect on the wafer detected by the inspection apparatus 1 having the apparatus ID. "Number of images" indicates a number of images picked up by the inspection apparatus 1 having the apparatus ID. "Judgment" indicates a result of judgment upon whether the wafer is good (G/NG) by the inspection device 1 having the apparatus ID. "Detailed information display" and "Defect display ON/OFF" consist of buttons used for performing detailed display of the defect detected by the inspection apparatus 1 having the apparatus ID and overlay display, respectively.

Figure 16:
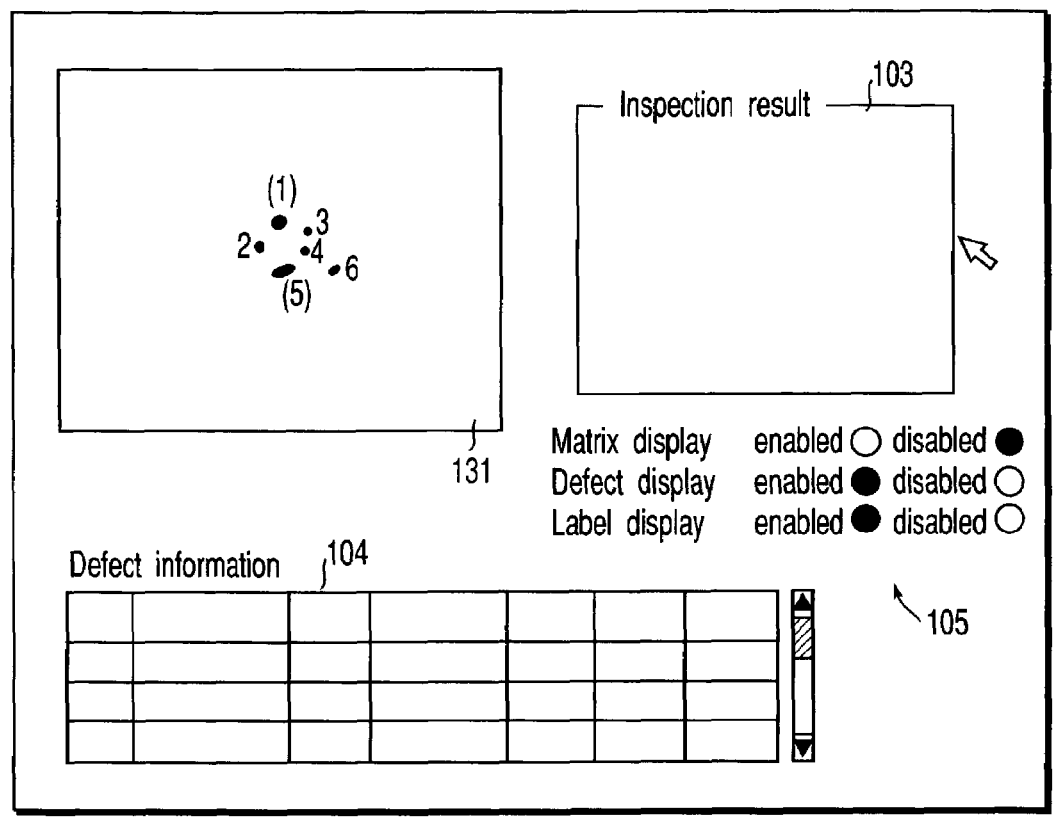
FIG. 16 is a view showing a third display example in the display section of the retrieval terminal according to the second embodiment of the present invention.

FIG. 16 is a view showing a third display example in the display section of the retrieval terminal 5. FIG. 16 shows a display example after operating (for example, click operation) a button of "Detailed information display" in the line "PA501" of "Apparatus ID" of the defect information by other apparatuses 123 illustrated in FIG. 15 by using a non-illustrated mouse or keyboard in the retrieval terminal 5 by an operator. "PA501" is an ID of the pattern inspection apparatus 1 (#2) which carries out the pattern inspection. It is to be noted that parts other than that concerning the following description are not illustrated in FIG. 16.

In the display section, the enlarged image of the wafer 131, the inspection result 103, the defect information 104 and others are displayed. In the enlarged image of the wafer 131, an image of each defect which is the same as the defect in the enlarged image 121 shown in FIG. 15 and detected by the inspection apparatus 1 (#2) is displayed and an inherent number (label) is given to each defect. Additionally, for example, as with defects indicated by numbers "1" and "5", a defect image whose number is encircled by a circle has a linked image, and a defect image whose number is not encircled has no linked image.

In the inspection result 103, the inspection result obtained by each of the inspection apparatuses 1 (#1 to #4 and others) is displayed in characters. The defect information 104 consists of items of above-mentioned "Label", "Defect name, "Probability", "Coordinate of gravitational center", "Area", "Detection by other apparatuses" and "Linked image" concerning each defect detected by the inspection apparatus 1 (#2). As a result, an operator can observe an image obtained by the macro inspection with respect to the same defect and then observe an image obtained by the pattern inspection.

Figure 17:
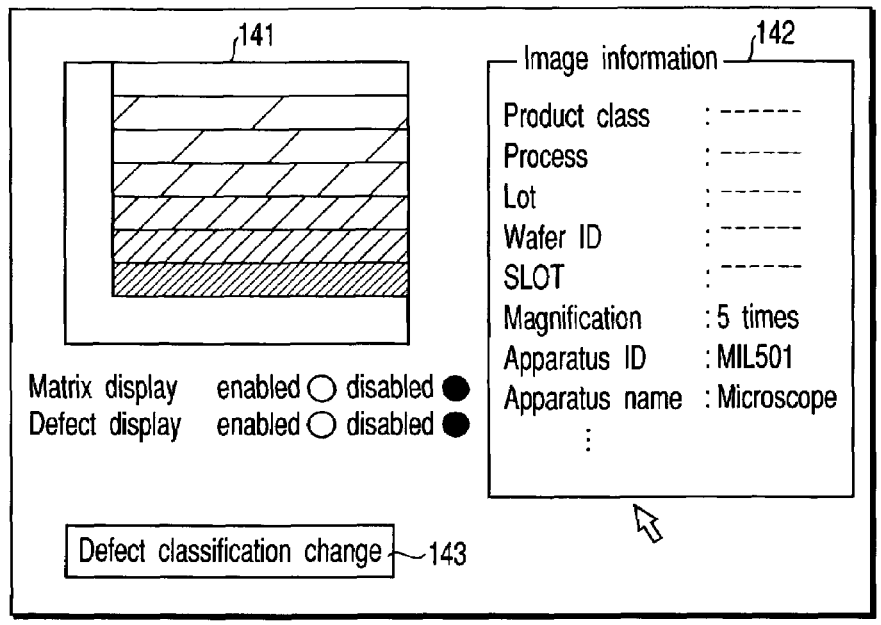
FIG. 17 is a view showing a fourth display example in the display section of the retrieval terminal according to the second embodiment of the present invention.

FIG. 17 is a view showing a fourth display example in the display section of the retrieval terminal 5. FIG. 17 shows a display example after performing an operation (for example, click operation) for selecting the number "1" on the wafer image 101 in FIG. 14 by using a non-illustrated mouse or keyboard in the retrieval terminal 5 by an operator. The server main body 44 retrieves a record in the data base 42 in accordance with the operation from the retrieval terminal 5, reads the inherent information in the inspection apparatus 1 (#3) which performs the microscopic inspection and the information of the inspection result from the hard disk 43 (or the process controller 6), and supplies them to the retrieval terminal 5 through the LAN 32 (or the LAN 31). The retrieval terminal 5 displays the received information in the display section as depicted in FIG. 17. It should be noted that parts other than that concerning the following description are not illustrated in FIG. 17.

In the display section, there are displayed an enlarged image of the wafer 141, image information 142, a later-described button 143 used for changing classification of defects and the like. In the enlarged image of the wafer 141 is displayed an image obtained by the microscopic inspection liked to an image of the defect obtained by the macro inspection indicated by the number "1" on the wafer image 101 in FIG. 14. That is, in the enlarged image of the wafer 141, the image of the defect which is the same as the defect on the wafer image 101 in FIG. 14 and detected by the inspection apparatus 1 (#3) is displayed. As a result, an operator can observe the image obtained by the macro inspection and then observe the image obtained by the microscopic inspection with respect to the same defects. Incidentally, when there is no image obtained by the microscopic inspection linked to the image of the defect obtained by the macro inspection, the image 141 is not displayed. Further, in the image information 142, inherent information of the wafer obtained in the microscopic apparatus 1 (#3) which is a target of link is displayed in characters. Furthermore, when an operator observes the enlarged image of the wafer 141 and confirms that a type of that defect is different from "Defect name" displayed in the defect information 104 shown in FIG. 14, "Defect name" can be changed by operating (for example, click operation) the button 143 by using a mouse or keyboard. The information of this change is registered in a later-described defect classification dictionary in the hard disk 43.

Figure 18:
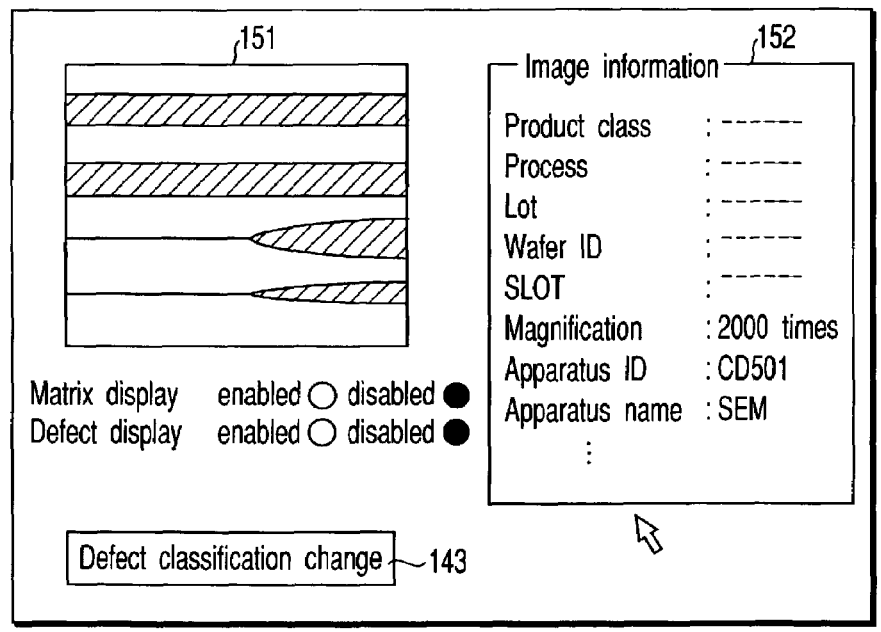
FIG. 18 is a view showing a fifth display example in the display section of the retrieval terminal according to the second embodiment of the present invention.

FIG. 18 is a view showing a fifth display example in the display section of the retrieval terminal 5. FIG. 18 shows a display example after performing an operation (for example, click operation) for selecting a predetermined position (for example, a central part of a defect) on the enlarged image of the wafer 141 in FIG. 17 by using a non-illustrated mouse or keyboard in the retrieval terminal 5 by an operator. The server main body 44 retrieves a record in the data base 42 in accordance with the operation from the retrieval terminal 5, reads the inherent information in the inspection apparatus 1 (#4) which carries out the SEM inspection and the information of the inspection result from the hard disk 43 (or the process controller 6), and supplies them to the retrieval terminal 5 through the LAN 32 (or the LAN 31). The retrieval terminal 5 displays the received information in the display section as shown in FIG. 18. It is to be noted that parts other than that concerning the following description are not illustrated in FIG. 18.

An enlarged image of the wafer 151, image information 152, a button 143 used for changing classification of defects which will be described later, and others are displayed in the display section. In the enlarged image of the wafer 151, there is displayed an image obtained by the SEM inspection linked to an image of a defect which is shown in the enlarged image of the wafer 141 in FIG. 17 and detected by the microscopic inspection. That is, in the enlarged image of the wafer 151, there is shown an image of the defect which is the same as the defect shown in the enlarged image of the wafer 141 in FIG. 17 and detected by the inspection apparatus 1 (#4). As a result, an operator can observe the image obtained by the microscopic inspection and then observe the image obtained by the SEM inspection with respect to the same defects. Incidentally, if there is no image obtained by the SEM inspection linked to the image of the defect obtained by the microscopic inspection, the image 151 is not displayed. Further, in the image information 152, inherent information in the inspection apparatus 1 (#4) which is a link target is displayed in characters.

Furthermore, when an operator uses a non-illustrated mouse or keyboard in the retrieval terminal 5 and operates (for example, click operation) to select an encircled number ("1" or "5") on the enlarged image of the wafer 131 in FIG. 16, the content in FIG. 18 can be displayed in the display section of the retrieval terminal 5. Consequently, an operator can observe the image obtained by the pattern inspection and then observe the image obtained by the SEM inspection with respect to the same defects.

Figure 19:
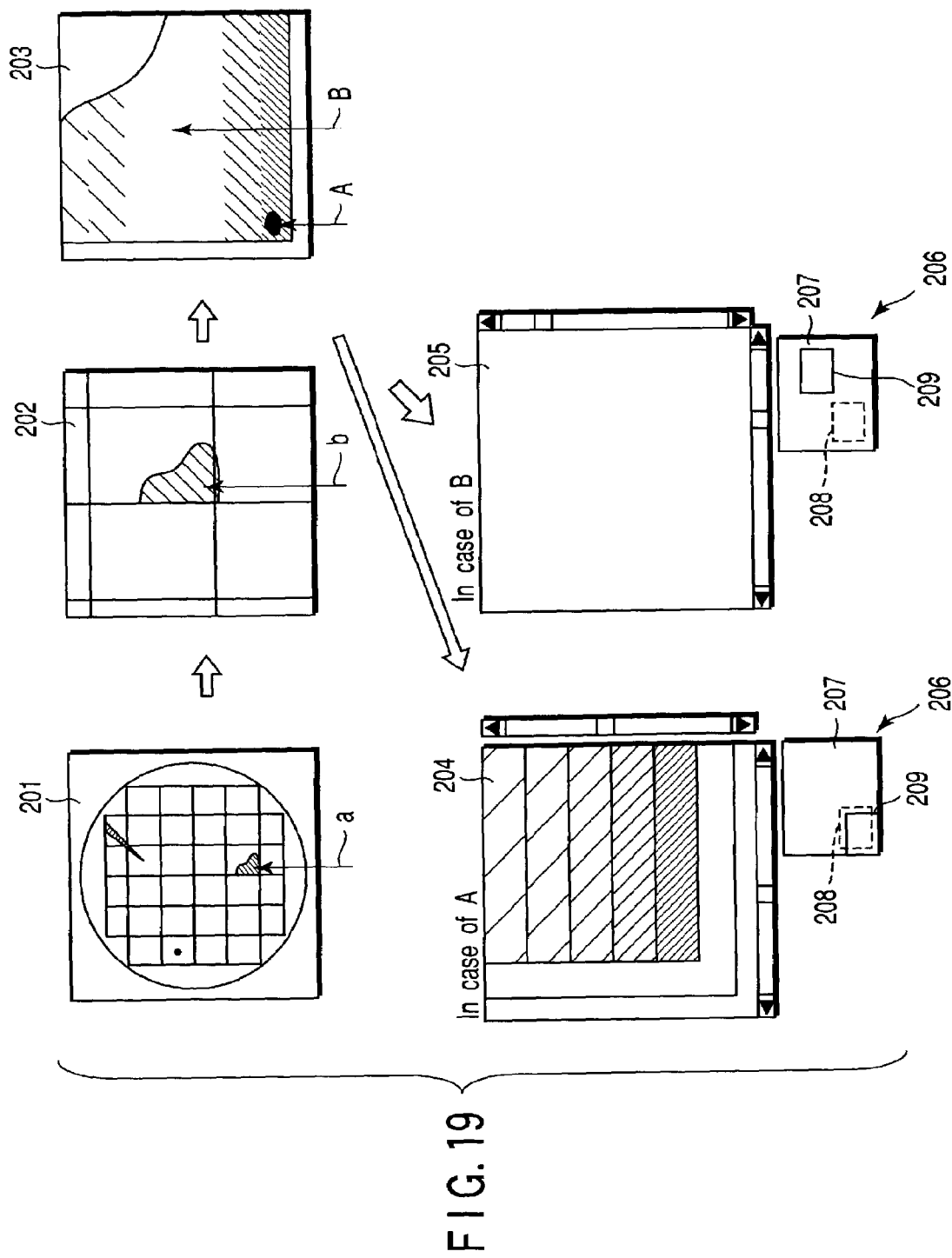
FIG. 19 is a view showing a modification of image display of a wafer according to the second embodiment of the present invention.

FIG. 19 is a view showing a modification of display of an image of a wafer which is changed in the order of FIG. 14 and FIG. 17 mentioned above. In the display example of FIG. 19, an image obtained by the macro inspection is gradually enlarged in the display section of the retrieval terminal 5, and it is then changed over to an image obtained by the microscopic inspection. A wafer image 201 is the same as the wafer image 101. When an operator uses a mouse or a keyboard and operates (for example, click operation) to select an image of a defect indicated by an arrow a in the wafer image 201, the wafer image 202 obtained by the macro inspection is enlarged and displayed while mainly focusing on the defect image. Moreover, when an operator uses a mouse or a keyboard and operates (for example, click operation) to select an enlarged defect image indicated by an arrow b in the wafer image 202, that defect image is further enlarged and displayed as a wafer image 203.

Subsequently, when an operator uses a mouse or a keyboard and operates (for example, click operation) to select an arbitrary part in the wafer image 203, a microscopic image linked to an image of that part is displayed. For example, when an operator manipulates to select a part indicated by an arrow A, a microscopic image 204 linked to an image of that part is displayed. In addition, when an operator manipulates to select a part indicated by an arrow B, nothing is displayed as indicated by reference numeral 205 since there is no microscopic image linked to an image of that part. In this manner, since a part selected by an operator is mainly displayed after switching to the microscopic image 204, nothing is displayed if there is no linked image. Therefore, by displaying a position at which a linked image exists in an emphatic color or the like on the wafer image 203, the position at which the linked image exists can be confirmed.

Incidentally, a sub image 206 showing the relationship of a display range between an image obtained by the macro inspection and a microscopic image linked to that image is also displayed in the display section of the retrieval terminal 5 during display of the microscopic image. In the sub image 206, there are displayed a display range 207 of the wafer image 203 immediately before display the microscopic image, a display range 208 of the linked microscopic image 204 and a current display range 209, respectively, in the frames. As a result, an operator can be aware of the relationship of each display range of the image obtained by the macro inspection, the linked microscopic image and the current image, thereby effectively observing the wafer.

As described above, by operating to select an image obtained by the macro inspection, a wafer image can be enlarged and displayed while focusing on a selected part, and the image can be gradually enlarged for display up to a predetermined magnification. Additionally, if there is an image obtained by any other inspection apparatus which is linked to a predetermined part in the enlarged image, automatic switching is carried out in order to display that image. For example, switching is performed when the magnification is equal to or greater than that of the image of any other inspection apparatus. As a result, an operator can gradually enlarge and observe a defect in the wafer image.

As shown in FIG. 14, in the display section of the retrieval terminal 5 are provided respective buttons 106 used for performing detailed information display of, e.g., the overlap inspection or the film thickness measurement and overlay display. In the overlap inspection or the film thickness measurement, the inspection concerning the entire wafer is carried out in a similar may to the macro inspection. When the overlap inspection or the film thickness measurement is effected, "Present" is displayed on the left side of a corresponding button 106. In this state, when an operator uses a mouse or a keyboard and operates (for example, click operation) the button 106 of "Detailed information", detailed information of the overlap inspection or the film thickness measurement is downloaded from the hard disk 43 (or the process controller 6) to the retrieval terminal 5. The retrieval terminal 5 displays the detailed information in characters in a window on the display section. Further, when an operator uses a non-illustrated mouse or keyboard and operates (for example, click operation) the button 106 of "Overlay", the retrieval terminal 5 displays the downloaded image data of the overlap inspection or the film thickness measurement on the wafer image 101 in the overlay manner.

As a result, an operator can see the defect image obtained by the macro inspection and the defect image obtained by the overlap inspection or the film thickness measurement simultaneously on the wafer image 101, thereby observing the state of each defect in detail.

Furthermore, as shown in FIG. 14, a button 107 used for superposing and displaying defect images in a plurality of processes for manufacturing the wafer on the wafer image 101 is provided in the display section of the retrieval terminal 5. When an operator uses a mouse or a keyboard and operates (for example, click operation) the button 107, a window for selecting a product class of the wafer is displayed. When an operator operates to select a plurality of processes having images which must be displayed, image data obtained by respective inspections in these respective processes is downloaded from the hard disk 43 (or the process controller 6) to the retrieval terminal 5. The retrieval terminal 5 superposes and displays these sets of image data on the wafer image 101 in the order of the respective processes with time. It should be noted that if a color of a defect image is changed and displayed in accordance with each process, the state of generation of the defect can be further easily recognized. In this manner, by superposing and displaying defect images in the respective inspection apparatuses in a plurality of processes for manufacturing the wafer in order in accordance with each process, an operator can recognize a process in which the defect is generated, thereby readily grasping a factor of occurrence of the defect.

Furthermore, when an operator uses a mouse or a keyboard and operates (for example, click operation) to select an item of any desired one of the inspection apparatuses 1 (#1 to #4 and others) in the inspection result 103 shown in FIG. 14, the detailed information and the image of the inspection result obtained by that inspection apparatus can be displayed in another window, or the wafer image 101 can be switched to an image of that inspection apparatus for display.

Moreover, as shown in FIG. 15, in the defect information by any other apparatus 123 displayed in the display section of the retrieval terminal 5, information of the inspection apparatus 1 which can readily detect a target type of defect is displayed in favor. That is, in FIG. 15, as shown in the defect information 122, since a name of the defect is "Defocus", the inspection result is display in the order of the inspection apparatuses 1 ("PA501" and "LA505") which can readily detect the defocus. As a result, an operator can see the inspection result or the image in the inspection apparatus which detects a defect which must be observed in favor.

In addition, when an operator uses a mouse or a keyboard and operates (for example, click operation) the button 108 shown in FIG. 14, re-classification processing is carried out. The server main body 44 makes reference to the records in the data base 42 and classifies detected defects based on the defect information shown in the inspection result of each inspection apparatus in the hard disk 43, in response to the operation from the retrieval terminal 5. For example, when an extraneous material is detected at an end portion of the wafer by the extraneous material detection apparatus and a streak-like film thickness defect is detected at a part corresponding to that extraneous material by the film thickness inspection apparatus, the server main body 44 classifies that defect as a comet. Additionally, when an error on the wafer is detected by the macro inspection apparatus and an overlap error is detected by the overlap inspection apparatus, the server main body 44 classifies that defect as a mask displacement. Further, when an error on the wafer is detected by the macro inspection apparatus and a pattern inspection is detected by the pattern inspection apparatus, the server main body 44 classifies that defect as a defocus. These classification results are transmitted from the server main body 44 to the retrieval terminal 5 and shown in the defect information 104 illustrated in FIG. 14.

The server main body 44 has a function for classifying each defect information in the hard disk 43 and registering it in the defect classification dictionary, and also has a function to learn classification information of defects registered in the defect classification dictionary in order to facilitate classification. It is possible to select automatic execution of the defect information classification function and the classification dictionary registration function by setting the server main body 44 or manual execution of these functions by the manipulation of an operator. Furthermore, in case of automatic execution, since reduction in processing speed of the server main body 44 can be predicted, it is effective to perform processing by a computer different from the server main body 44.

Moreover, the server main body 44 makes judgment upon whether a target wafer is acceptable based on the inspection results in the respective inspection apparatuses 1 (#1 to #4 and others) and supplies the judgment result to the retrieval terminal 5. In the retrieval terminal 5, the received judgment result is displayed in the display section, and a warning is displayed if the wafer is rejectable.

In addition, the information of the inspection results stored in the hard disk 43 or the data base 42 is periodically stored in a backup medium in the backup device 41. This backup processing is automatically carried out when the server main body 44 receives information indicative of completion or delivery of a product from the process controller 6. In the backup processing, the image information or the like of the respective processes of a corresponding product are collectively backed up based on the information in the data base 42. The backup device 41 can sort product names by using a backup auto loader during backup and store information of respective lots of the same products in one tape. The backup device 41 displays a warning when each tape is full of information, and waits for judgment upon whether the information should be stored on another tape or the tape should be replaced.

The inspection apparatus 1 (#1) has a function for notifying the process controller 6 through the LAN 32, the image server 4 and the LAN 31 of the fact that inspection in another inspection apparatus is required together with information of the defect coordinates and the inspection results when an error is generated in the macro inspection. When the process controller 6 receives the notification, it instructs the inspection apparatus which requires the inspection to perform the inspection.

Additionally, by connecting the retrieval terminal 5 to the Internet connected to the LAN 31, it is possible to monitor the inspection status through the Web. As a result, a line manager can operate the image server section 4 from a remote site as well as a factory, thereby communicating the inspection result. Further, by configuring the processing controller 6 to display occurrence of an error on the Web and distribute this information to previously specified email addresses when the error is generated in an inspection process, a line manager can be aware of occurrence of the error from a remote site as well as a factory. Furthermore, since the LAN 31 for the line in a factory is a system different from the LAN 32 for transferring images, the burden on the both communication lines can be reduced.

As described above, according to the present invention, it is possible to provide the image data file management system and method which can efficiently save the image data and realize efficient management of the backup data.

The present invention is not restricted to the foregoing embodiments, and it can be appropriately modified and carried out without departing from the scope of the invention.

According to the present invention, it is possible to provide the image data file management system and method which can efficiently manage the image data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inspection apparatus system for performing various inspections on a subject in at least a plurality of manufacturing processes of a production line, said inspection apparatus system comprising:
    an inspection apparatus including: (i) an image pickup section which acquires image data representing the subject, (ii) a determination section which automatically determines whether or not the subject is good, based on a result of a defect inspection performed on the image data, which is acquired by the image pickup section and subjected to image processing, and (iii) a compression section which performs nonreversible compression on the image data when the determination section determines that the subject is good, and which performs reversible compression on the image data when the determination section determines that the subject is not good; and
    an image server connected to the inspection apparatus and configured to store the image data only after the determination section determines whether or not the subject is good, and after the compression section then performs one of the nonreversible compression on the image data, when the determination section determines that the subject is good, and the reversible compression on the image data, when the determination section determines that the subject is not good.

2. The inspection apparatus system according to claim 1, wherein the inspection apparatus is arranged in the production line and connected to the image server, which is arranged outside the production line, through a communication line.

3. The inspection apparatus system according to claim 1, wherein the compression section performs compression processing with respect to a differential image between a master image and an inspection image of the subject.

4. The inspection apparatus system according to claim 1, wherein the compression section performs compression processing with respect to only a difference between a master image and an inspection image of the subject which exceeds a standard deviation value relative to a brightness value of the master image.

5. The inspection apparatus system according to claim 1, wherein the image server includes a database section and a backup section;
    wherein the backup section collectively stores a predetermined number of sets of the image data for backup; and
    wherein the database section stores a position at which the image data is stored and stores an identifier of the backup section used for storing the image data for backup.

6. The inspection apparatus according to claim 5, wherein the image server performs backup processing for the determination by the determination section based on delivery information.

7. The inspection apparatus system according to claim 1, wherein the image server periodically monitors a temporary directory and moves the image data to a directory structure based on a file name stored in the temporary directory in accordance with predetermined rules.

8. The inspection apparatus system according to claim 7, wherein reduced images of the image data are created and a list of the reduced images is displayed.

9. The inspection apparatus system according to claim 1, wherein the inspection apparatus comprises a micro inspection apparatus judges whether a defect of the subject is acceptable by enlarging the defect, and the compression section performs high compression with respect to a micro image determined as acceptable and performs low compression with respect to a micro image determined as rejectable.

10. The inspection apparatus system according to claim 1, wherein the image server monitors a storage capacity of a hard disk which stores the image data, and changes a compression ratio used by the compression section when the capacity becomes equal to or less than a predetermined capacity.

11. An image data file management method for use in an inspection apparatus system which performs various inspections on a subject in at least a plurality of manufacturing processes of a production line, comprising:
    acquiring image data representing the subject, using an image pickup section incorporated in an inspection apparatus of the inspection apparatus system;
    then automatically determining whether or not the subject is good, based on a defect inspection result acquired by performing image processing on the image data using the inspection apparatus;
    then performing nonreversible compression on the image data when it is determined that the subject is good, and performing reversible compression on the image data when it is determined that the subject is not good; and
    then storing only the compressed image data into an image server that is connected to the inspection apparatus via a communication line,
    wherein said determining is performed after said acquiring, said compression is performed after said determining, and said storing is performed after said compression.

* * * * *